3,496,276
COMPOSITION CONTAINING DIARYL SUBSTITUTED BENZOCYCLOALKANES HAVING A HYPOCHOLESTEROLEMIC EFFECT
William Laszlo Bencze, New Providence, N.J., assignor to Ciba Corporation, New York, N.Y., a corporation of Delaware
No Drawing. Continuation-in-part of application Ser. No. 481,954, Aug. 23, 1965. This application Dec. 18, 1967, Ser. No. 691,168
Int. Cl. A61k 27/00
U.S. Cl. 424—308                              1 Claim

ABSTRACT OF THE DISCLOSURE

Diaryl-benzocycloalkanes, e.g. those of the formula

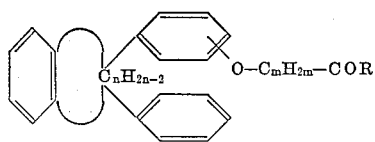

$n=3-7$
$m=1-7$
R=OH, alkoxy or amino and salts thereof exhibit hypocholesterolemic effects.

CROSS-REFERENCES TO RELATED APPLICATIONS

This is a continuation-in-part of application Ser. No. 481,954, filed Aug. 23, 1965, which in turn is a continuation-in-part of application Ser. No. 451,651, filed Apr. 28, 1965, (now abandoned), which in turn is a continuation-in-part of application Ser. No. 401,256, filed Oct. 2, 1964 (now abandoned.)

SUMMARY OF THE INVENTION

The present invention concerns and has for its object the provision of diaryl-benzocycloalkanes having the Formula I:

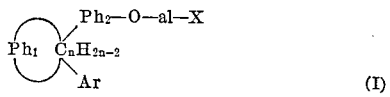

in which $Ph_1$ is a 1,2-phenylene radical, $C_nH_{2n}$ is lower alkylene forming with $Ph_1$ a 5 to 7 membered ring carrying the groups Ar and —$Ph_2$—O—al—X on two ring-carbon atoms, $Ph_2$ is a phenylene radical, al is a lower aliphatic radical, X is a free or functionally converted carboxy group and Ar is a carbocyclic or heterocyclic aryl radical, and salts thereof, as well as of the corresponding pharmaceutical compositions and of methods for the preparation of these products. Said compositions are especially useful as hypocholesterolemic agents bringing about an amelioration of certain syndromes, such as those caused by arteriosclerosis.

DESCRIPTION OF THE PREFERRED EMBODIMENTS

The phenylene radicals $Ph_1$ and $Ph_2$ are unsubstituted or substituted by one or more than one of the same or of different substitution. Such substituents are primarily lower alkyl, e.g. methyl, ethyl, n- or i-propyl or -butyl, etherified or esterified hydroxy, such as lower alkoxy, e.g. methoxy, ethoxy, n- or i-propoxy or n-butoxy, or halogeno, e.g. fluoro, chloro or bromo, or trifluoromethyl. $Ph_2$ preferably contains only one, but may have more than one of the substituent —O—al—X and/or of the other substituents mentioned above. The term "lower" referred to above or hereinafter in connection with organic radicals or compounds respectively, defines such with up to 7, preferably up to 4, carbon atoms.

More particularly $Ph_1$ stands for 1,2-phenylene, (lower alkyl) - 1,2 - phenylene, (lower alkoxy) - 1,2 - phenylene, (halogeno)-1,2-phenylene or (trifluoromethyl)-1,2-phenylene, and $Ph_2$ for 1,4-phenylene, (lower alkyl)-1,4-phenylene, (lower alkoxy)-1,4-phenylene, (halogeno)-1,4-phenylene or (trifluoromethyl)-1,4-phenylene.

The lower alkylene portion $C_nH_{2n}$ substituting two adjacent positions of $Ph_1$ is unbranched or branched and has preferably from 3 to 5 carbon atoms. Above all, two adjacent ring-carbon atoms thereof, one of which is preferably adjacent to $Ph_1$, carry the radicals Ar and —$Ph_2$—O—al—X. Said alkylene portion represents, for example, 1,3-propylene, 1,3-, 2,4- or 1,4-butylene, 2- or 3 - methyl - 1,4 - butylene, 2,3-dimethyl-1,4-butylene, 1,4-, 2,5- or 1,5-pentylene, 3-methyl-1,4-pentylene, 2-methyl-1,5-pentylene, 1,4-, 2,5- or 1,5-hexylene, 2,6- or 3,5-heptylene.

The lower aliphatic radical al preferably represents lower alkylene, but also lower alkenylene or alkynylene, above all such having up to 5 carbon atoms, such as methylene, 1,1- or 1,2-ethylene, 1,1-, 1,2-, 2,2- or 1,3-propylene, 1,1-, 1,2-, 2,2-, 1,3-, 2,3- or 1,4-butylene, 1,1-, 2,2-, 3,3- or 2,4-pentylene; ethenylene, 1,2-, 2,3- or 1,3-propenylene, 1,4-butenylene, 1,4- or 2,4-but-2-enylene or 2,3-pent-2-enylene; ethynylene, 1,3-propynylene, 1,3-butynylene, 1,4-but-2-ynylene or 1,4-pent-2-ynylene. The radical al may also stand for a 1,1-cycloalkylidene radical having from 3 to 8, preferably from 5 to 7 ring-carbon atoms, e.g. 1,1-cyclopentylidene, 1,1-cyclohexylidene or 1,1-cycloheptylidene, as well as 1,1-cyclopropylidene, 1,1-cyclobutylidene or 1,1-cyclooctylidene.

The group X preferably stands for free or esterified carboxy, the latter, for example, contains above all lower alkyl, e.g. methyl, ethyl, n- or i-propyl, n-, i-, sec. or tert. butyl, but also substituted lower alkyl, particularly tert. amino-lower alkyl or lower alkoxy-lower alkyl in which the amino or alkoxy group is separated from the carboxy-oxygen by at least 2 carbon atoms, preferably by 2 or 3 carbon atoms. A tertiary amino group is above all di-lower alkylamino, e.g. dimethylamino or diethylamino, as well as lower alkyleneimino, lower mono-oxa- or aza-alkyleneimino having from 4 to 7 ring members, such as pyrrolidino, piperidino, morpholino or 4-lower alkyl-piperazino, e.g. 4-methylpiperazino. More particularly X represents carboxy, lower alkoxy-carbonyl, 2-di-lower alkylamino- or lower alkyleneimino-ethoxy-carbonyl or 2-lower alkoxy-ethoxycarbonyl. X, however, may also stand for carbamyl, mono- or di-lower alkyl-carbamyl, di-lower alkylamino- or lower alkyleneimino-lower alkylcarbamyl or cyano.

A carbocyclic aryl radical Ar, preferably represents phenyl or phenyl substituted by one or more than one of the same or of different substituents attached to any of the positions available for substitution. More particularly Ar stands for phenyl, (lower alkyl)-phenyl, (lower-alkoxy) - phenyl, (halogeno) - phenyl, (trifluoromethyl)-phenyl or X-al-O-phenyl. A heterocyclic aryl radical Ar is particularly hexacyclic azacyclic aryl, especially pyridyl or (lower alkyl)-pyridyl, e.g. 3- or 4-pyridyl.

The compounds of the invention exhibit valuable pharmacological properties. Apart from their liver enlarging effects, due to an increase in size and number of liver cells and their shortening of the duration of the pharmacological effects of barbiturate compounds, they cause primarily a reduction of the cholesterol level in the blood, which can be demonstrated in animal tests using, for example mammals, such as mice, rats or dogs, as test objects. Besides their above-mentioned utility, the compounds of the invention are also useful as liver-protecting agents, for example, in the treatment of liver poisoning caused by chemicals, e.g. carbon tetrachloride and the like, or disease, e.g. liver cirrhosis and the like, as agents limiting barbiturate-induced sleep, as research tools, and as intermediates in the preparation of other valuable products.

Particularly useful are compounds of the Formula II:

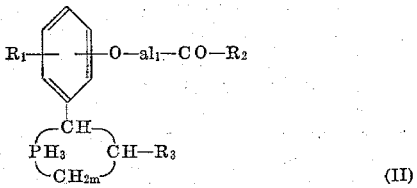
(II)

in which $Ph_3$ is 1,2-phenylene, (lower alkyl)-1,2-phenylene, (lower alkoxy)-1,2-phenylene or (halogeno)-1,2-phenylene, $R_1$ is hydrogen, lower alkyl or halogeno, $al_1$ is straight or branched alkylene with up to 5 carbon atoms, $R_2$ is hydroxy, lower alkoxy, di-lower alkyl-amino-lower alkoxy or-alkylamino or 5 to 7 ring-membered alkylene-imino-lower alkoxy or-alkylamino, wherein the heteroatoms are separated by at least 2 carbon atoms, $R_3$ is phenyl, (lower alkyl)-phenyl, (lower alkoxy)-phenyl, (halogeno)-phenyl or ($R_2OOC$—$al_1$—O)-phenyl and $m$ is one of the integers from 1 to 3, and salts thereof.

Outstandingly valuable compounds are the compounds of Formula III:

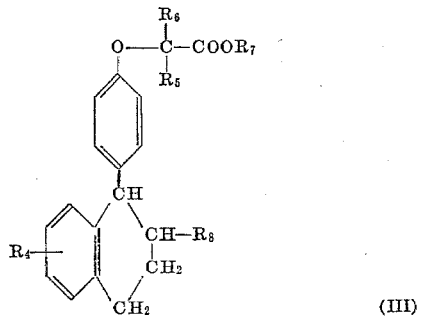
(III)

in which $R_4$ is hydrogen or chloro, each of $R_5$ and $R_6$ is hydrogen or methyl, $R_7$ is hydrogen or lower alkyl and $R_8$ is phenyl, (methoxy)-phenyl, (fluoro)-phenyl or (chloro)-phenyl and alkali metal salts of the compounds in which $R_7$ is hydrogen, which, when given orally at doses between about 1 and 20 mg./kg./day, preferably between about 5 and 10 mg./kg./day, to rats which are either on a normal or high cholesterol diet, show outstanding hypocholesterolemic effects.

In the above compounds the two aromatic groups substituting the aliphatic portion of the bicyclic ring system may have the cis-or the trans-configuration.

The compounds of the invention are prepared according to methods known per se. For example, they are obtained by (a) converting in a compound of the Formula IV:

(IV)

in which $Ph_4$ is a phenyl group corresponding to $Ph_2$ and substituted at least by one Y, which is a substituent capable of being converted into the group —O—al—X, the substituent Y into said group, or (b) replacing in a compound of the Formula V:

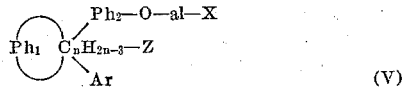
(V)

in which Z represents hydroxy or esterified hydroxy, Z by hydrogen, or (c) hydrogenating in a compound of the Formula VI:

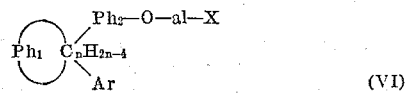
(VI)

the double bond in the alkenylene portion —$(C_nH_{2n-4})$—, or (d) reacting a compound of the Formula VII:

(VII)

or a reactive ester or the unsaturated anhydro derivative thereof, with a compound of the formula

H—$Ph_2$—O—al—X in the presence of a Lewis acid and, if desired, converting in a resulting acid the carboxyl group into a functionally converted carboxyl group, and/or converting the latter group into a free or another functionally converted carboxyl group, and/or converting a resulting acid or base into a salt thereof, and/or a salt into the free compound or another salt and/or separating a resulting mixture of isomers.

In the starting material of the Formula IV, one or more than one substituent Y is converted into the group —O—al—X in one step or in stages. A particularly suitable substituent Y is a hydroxy group. Its conversion into the desired final group is carried out in known manner. For example, the starting material having such phenolic hydroxy may be converted into a salt, e.g. a metal salt, such as an alkali metal salt, e.g. lithium, sodium or potassium salt. Its formation may be achieved, for example, by reacting the starting material with a metal salt-forming reagent, such as an alkali metal hydride or amide, e.g. lithium or sodium hydride, sodium or potassium amide, an alkali metal lower alkoxide, e.g. lithium, sodium or potassium methoxide, ethoxide or tertiary butoxide, an alkali metal compound of a hydrocarbon, e.g. butyl lithium, phenyl lithium or phenyl sodium, a metal hydroxide or carbonate, e.g. lithium, sodium or potassium hydroxide, carbonate or hydrogen carbonate or calcium hydroxide. The preparation of the metal compounds is advantageously carried out in the presence of a solvent selected on the basis of the physicochemical characteristics, e.g. the solubility, of the starting material, as well as the reactivity of the metal compound-forming reagent; suitable solvents are, for example, hydrocarbons, e.g. hexane, benzene, toluene or xylene, ethers, e.g. diethyl ether, p-dioxane, tetrahydrofuran or diethyleneglycol dimethyl-ether, formamides, e.g. dimethylformamide, lower alkanols, e.g. methanol or ethanol, ketones, e.g. acetone, or solvent mixtures.

The starting material, particularly a salt thereof, is then reacted with a compound of the formula $R_9$—al—X in which $R_9$ stands for a reactive esterified hydroxyl group. The latter is above all a hydroxyl group esterified with a strong mineral acid, particularly a hydrohalic acid, e.g. hydrochloric or hydrobromic acid, sulfuric acid or a sulfonic acid, such as a lower alkane sulfonic acid, e.g. methane or ethane sulfonic acid, or a monocyclic carbocyclic aryl-sulfonic acid, e.g. p-toluene sulfonic acid. The preferred reactive esters used as the reagents in the reaction (a) are those of the formula Hal—al—X in which Hal is halogeno, having preferably an atomic weight greater than 19, and representing above all chloro or bromo.

The reaction of the starting material, particularly a metal compound thereof, with the reactive ester reagent is preferably carried out in a suitable diluent, for example, the solvent used for the preparation of the salt, which, however, may be replaced by or diluted with another solvent. If necessary, it is performed while cooling or at an elevated temperature, and/or, in the atmosphere of an inert gas, e.g. nitrogen.

The formation of the metal salt of the starting material may also be carried out in situ, i.e. the starting material having a phenolic hydroxyl group and the reagent having a reactive esterified hydroxyl group are reacted together in the presence of a salt-forming reagent, or of another suitable base.

The conversion of a free hydroxyl group substituting $Ph_4$ in the above starting material into the group —O—al—X may also be carried out by reacting the starting material with a compound of the formula HO—al—X in the presence of a condensing agent, such as a di-substituted carbonate, for example, a diaryl carbonate, e.g. diphenyl carbonate or especially a di-lower alkyl carbonate, e.g. dimethyl or diethyl carbonate, or a carbodiimide, e.g. di-cyclohexyl-carbodiimide. The reaction with the carbonate is advantageously carried out at an elevated temperature, ranging from about 100° to about 210°, preferably from about 180° to about 200°, if desired, in the presence of a transesterification catalyst, such as sodium or potassium carbonate or a sodium lower alkanoate e.g. sodium methylate, and preferably in the absence of a diluent.

A further modification of the conversion of a hydroxyl group substituting $Ph_4$ into the group —O—al—X, comprises reacting the starting material or a salt thereof with corresponding aliphatic aldehyde or ketone in the presence of a tri- or tetra-halogenated methane derivative and a strong base.

A tri- or tetra-halogenated methane derivative used in the above reaction is, for example, chloroform, 1,1,1-trichloro-acetone, bromoform, 1,1,1-tribromo-acetone, iodoform, chloral, chloral hydrate, bromal, bromal hydrate, carbon tetrachloride or carbon tetrabromide. A strong base used in the above procedure is particularly an alkali metal hydroxide, e.g. sodium or potassium hydroxide, which is preferably used in solid form. The reaction is advantageously carried out in the presence of a diluent, which may be furnished by an excess of the ketone reagent, and at an elevated temperature, if necessary, in a closed vessel and/or, in the atmosphere of an inert gas, e.g. nitrogen.

A further substituent Y capable of being converted into the radical —O—al—X is the group —O—CO—$R_{10}$ in which $R_{10}$ stands for halogeno, particularly chloro or bromo, or etherified hydroxy, primarily lower alkoxy, e.g. methoxy or ethoxy, as well as phenoxy.

A starting material having such substituent is reacted with a compound of the formula HO—al—X and the reaction is carried out according to known methods, preferably at temperatures ranging from about 100° to about 210°, if desired, in the presence of a suitable transesterification catalyst, e.g. sodium or potassium carbonate and in the absence or presence of a suitable diluent.

In the starting material of Formula V, Z is primarily hydroxy, but may also be esterified hydroxy, particularly halogeno, e.g. chloro or bromo. It preferably substitutes the same carbon atom as the group —$Ph_2$—O—al—X.

The group Z may be replaced by hydrogen according to known elimination methods, for example, by treating the starting material with hydrogen, e.g. hydrogen in the presence of a catalyst, e.g. a palladium catalyst or Raney nickel and a suitable diluent, e.g. ethanol, or nascent hydrogen, generated, for example, by the action of metals on acids, e.g. zinc and acetic acid, if necessary at an increased pressure and/or at an elevated temperature.

Starting materials of the Formula VI may be converted into the compounds of the invention according to known methods, preferably by treatment with catalytically activated hydrogen, using, for example, a catalyst containing a metal of the eighth group of the Periodic System, such as a palladium catalyst, e.g. palladium or charcoal, and a solvent, e.g. ethyl acetate or ethanol, or a solvent mixture, if necessary, at an elevated temperature, and/or under pressure. According to this procedure, the cis-epimers of the compounds having the formula I are predominantly formed, i.e. those in which the Ar- and —$Ph_2$—O—al—X moiety have the same spatial orientation.

In the starting material of the Formula VII the hydroxyl group substituting a ring-carbon atom of the alkylene radical is preferably located at the 1-position, i.e. adjacent to the 1,2-phenylene radical. Accordingly, the double bond of the anhydro derivative thereof is in conjugation with $Ph_1$. The reaction is carried out according to known methods, for example, by reacting the two compounds in the presence of a Lewis acid, such as a strong inorganic acid, e.g. sulfuric or phosphoric acid, or a Friedel-Crafts reagent, e.g. aluminum chloride or ferric chloride.

In a resulting compound with a free carboxyl group, such group is converted into a functionally converted carboxyl group according to known procedures. For example, a free carboxyl group is converted into an esterified carboxyl group, for example, by treatment of the carboxylic acid compound with an alcohol, such as a lower alkanol, in the presence of an esterifying acidic reagent, e.g. hydrochloric or sulfuric acid, or with a diazo-compound, e.g. a lower diazo-alkane, or by converting the carboxylic acid compound into a carboxylic acid halide, e.g. chloride, and reacting the latter with an alkali metal, e.g. sodium or potassium, alcoholate, e.g. lower alkanolate, or by reacting a salt of the carboxylic acid compound with a reactive ester of an alcohol, such as an aliphatic halide, e.g. a lower alkyl halide, as well as an N,N-disubstituted amino-lower alkyl halide or an acid addition salt thereof, in the presence of a metal salt-forming base, e.g. potassium carbonate, or any other suitable esterification procedure.

A free carboxyl group in a resulting compound may also be converted into a functionally converted carboxyl group other than an esterified carboxyl group, such as a nitrogen-containing functionally converted carboxyl group. For example, a carboxylic acid halide derivative may be reacted with ammonia, a primary or a secondary amine to yield a carboxamide compound, or the ammonium salt of a carboxylic acid compound may be dehydrated, for example, by treatment with a suitable dehydrating reagent, e.g. phosphorus pentoxide or phosphorus oxychloride, to yield the corresponding amide; the latter may be further dehydrated to yield the corresponding nitrile compound.

A functionally converted carboxyl group in a resulting compound may be converted into a free carboxyl group. For example, an esterified carboxyl group may be converted into a free carboxyl group by hydrolysis, for example, by treatment with a base, e.g. sodium or potassium hydroxide, or any other suitable hydrolysis reagent. Or, the cyano group or a carboxamide group in a resulting compound may be converted into the free carboxyl group by hydrolysis with a strong base, e.g. sodium or potassium hydroxide, or a strong acid, e.g. sulfuric acid.

A functionally converted carboxyl group in a resulting compound may be converted into another functionally converted carboxyl group. For example, an esterified carboxyl group may be converted into another esterified carboxyl group by transesterification, for example, by treatment with an alcohol, e.g. a lower alkanol, in the presence of a transesterification reagent, for example, a metal alcoholate, such as an alkali metal, e.g. sodium or potassium, lower alkoxide, or an aluminum lower alkoxide, an alkali metal cyanide, e.g. potassium cyanide, or benzyl trimethyl ammonium hydroxide. An esterified carboxyl group may be converted into a carboxamido group, for example, by treatment with ammonia, a primary or secondary amine, if necessary, under increased pressure.

Furthermore, a cyano group in a resulting compound may be converted into an esterified carboxyl group, e.g the carbo-lower alkoxy group, for example, by treatment of the nitrile compound with an alcohol, e.g. a lower alkanol, in the presence of a suitable mineral acid, e.g. sulfuric or hydrochloric acid.

A resulting compound having a free carboxyl group may be converted into its salts according to conventional methods, for example, by reacting the compound having a free carboxylic group with an about stoichiometric amount of a suitable salt-forming reagent, such as ammonium hydroxide, or an alkali metal hydroxide, amide or hydride, in the presence of a diluent and evaporating the latter. A salt of this type may be reconverted into the free carboxylic acid compound by treatment with an acid, e.g. hydrochloric, sulfuric or acetic acid.

A resulting compound having an acid addition salt-forming group, such as an amino group, may be converted into an acid addition salt thereof, for example, by reacting a solution of such compound in a solvent or solvent mixture, with an acid, such as one of the acids mentioned below or with a suitable anion exchange preparation, and isolating the desired salt. The latter may be converted into the free base by treatment with a basic reagent, e.g. a metal hydroxide, ammonia or a hydroxyl ion exchange preparation.

Resulting mixtures of isomers may be separated into the single isomers. For example, mixtures of cis- and trans-isomers may be separated into the single isomers by exploiting the physico-chemical differences, such as differences in solubility or different boiling points of such compounds. Racemates are resolved into antipodes according to conventional resolution procedures, for example, by using the racemate of a free carboxylic acid compound, forming a salt thereof with an optically active base, e.g. brucine, quinine or strychnine, separating the resulting salt mixture into the single salts and converting the isolated salt into the free, optically active carboxylic acid compound by treatment with a suitable acid.

Accordingly, the compounds of the invention are obtained in the free form or in the form of their salts, depending on the conditions under which the process is carried out. In view of the close relationship between the free compounds and the compounds in the form of their salts, whenever a free compound is referred to in this context, a corresponding salt, especially a pharmaceutically acceptable salt, is also intended, provided such is possible or appropriate under the circumstances.

Whenever the salt forming group in the compounds of the invention is a carboxyl group, salts are, for example, ammonium or, more particularly, metal salts, such as salts with alkali metals, e.g. sodium or potassium, or with alkaline earth metals, e.g. magnesium or calcium. Compounds, in which such group is a basic esterified carboxyl group, form acid addition salts, for example, those with inorganic acids, e.g. hydrochloric, hydrobromic, sulfuric, or phosphoric acid, or organic acids, such as carboxylic or sulfonic acids, e.g. formic, acetic, propionic, pivalic, glycolic, lactic, malonic, succinic, maleic, hydroxymaleic, malic, tartaric, citric, glucuronic, benzoic, salicylic, 4-amino-salicylic, 2-phenoxybenzoic, 2-acetoxybenzoic, nicotinic, isonicotinic, methane sulfonic, ethane sulfonic, ethane 1,2-disulfonic, 2-hydroxyethane sulfonic, p-toluene sulfonic or naphthalene 2-sulfonic acid. Salts, either those with metals or with acids, may also be used as intermediates, for example, in the preparation of pharmaceutically acceptable salts, or in the purification of the free compounds, as well as for identification or characterization purposes. Acid addition salts, which are prepared primarily for the latter, are, for example, those with certain inorganic acids, e.g. perchloric, phosphotungstic, phosphomolybdic, chloroplatinic or Reinecke acid or with acidic organic nitro compounds, e.g. picric, picrolonic or flavianic acid.

The starting materials of the Formulae IV, V and VII are known or, if new, may be prepared according to known methods. Those of the Formula IV may be prepared analogous to procedure $a$ or by reaction of a compound of the Formula VII, or a reactive ester or the unsaturated anhydro derivative thereof, with a compound of the formula H—Ph$_4$, in which Ph$_4$ is primarily a phenyl group substituted by hydroxy or a group capable of being converted into hydroxy. The latter is above all an etherified hydroxyl group, such as lower alkoxy, e.g. methoxy or ethoxy, as well as phenyl-lower alkoxy, e.g. benzyloxy. If necessary, such group is converted into hydroxyl according to known methods, for example, by acid hydrolysis, e.g. treatment with hydrobromic acid, hydriodic acid or pyridine hydrochloride, by hydrogenolysis, e.g. treatment with catalytically activated hydrogen, or any other appropriate method. If desired, a hydroxyl group in a resulting starting material is converted into a group —O—CO—R$_{10}$ according to known procedures suitable for the esterification of a phenolic hydroxyl group.

The starting material of the Formula V is prepared by reacting a ketone of the formula:

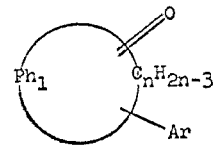

with the Grignard reagent Hal—Mg—Ph$_2$—O—al—X, in which Hal stands particularly for bromo, and carefully decomposing the resulting complex so as not to cause elimination of the hydroxyl group by dehydration. The intermediates used in the above Grignard reaction are known or may be prepared according to known methods; the Grignard reagent may be prepared, for example, according to the "Method of Entrainment," described by Kharash and Reinmuth, Grignard Reactions of Nonmetallic Substances (Prentice Hall, 1954). In a resulting starting material, the hydroxyl group may be esterified according to known methods. Some of the starting materials mentioned are also described in U.S. Patent No. 3,277,106.

The starting material of the Formula VI as well as salts of such compounds having salt-forming groups, is new and is intended to be included within the scope of the invention; apart from serving as an intermediate, it exerts the above-described hypo-cholesterolemic and liver-enlarging effect and is, therefore, used accordingly. Especially useful are the compounds that correspond to those of the Formulae II and III. They are prepared analogous to procedure (a) or by eliminating the compound Z—H from the starting material of the Formula V. If Z represents hydroxy the elements of water are eliminated, for example, by treatment of the intermediate with an acid, e.g. hydrochloric, sulfuric or phosphoric acid. In the case of Z being an esterified hydroxyl group, the elements of an acid representing H—Z are eliminated by treatment with a base, e.g. sodium hydroxide.

The invention also comprises any modification of the process, wherein a compound resulting as an intermediate at any stage of the process is used as starting material, and the remaining step(s) of the process is (are) carried out or the process is discontinued at any stage thereof, or in which the starting materials are formed under the reaction conditions, or in which the reaction components are used in the form of their salts.

In the process of this invention, those starting materials are preferably used, which lead to final products indicated before as being the preferred embodiments of the invention.

The new compounds of this invention are useful in the form of compositions for enteral or parenteral use, which contain the new compounds in admixture with a pharmaceutically acceptable solid or liquid carrier. For making up the preparations there are employed carrier materials, such as water, gelatine, sugars, e.g. lactose, glucose or sucrose, starches, e.g. corn starches, wheat starch or rice starch, stearic acid or salts thereof, e.g. magnesium or calcium stearate, talc, vegetable oils, stearyl alcohol, benzyl alcohols, tragacanth, gums, acacia, propylene glycol, polyalkylene glycols or any other known carrier materials used for such compositions. The latter are in solid form, for example, as capsules, tablets or dragees, or in liquid form, for example, as solutions, suspensions or emulsions. If desired, they may contain auxiliary substances, such as preserving, stabilizing, wetting, emulsifying, coloring or flavoring agents, salts for varying the osmotic pressure or buffers. The compositions are prepared according to standard methods used in the art of manufacturing such compositions, and may also contain, in combination, other therapeutically useful substances.

The following examples are intended to illustrate the invention and are not to be construed as being limitations thereon. Temperatures are given in degrees Centigrade.

EXAMPLE 1

A mixture of 6.74 g. of 1-(4-hydroxy-phenyl)-2-phenyl-1,2,3,4-tetrahydro-naphthalene (containing diethyl ether of crystallization) and 0.46 g. of metallic sodium in 100 ml. of xylene is refluxed for three hours. The suspension is allowed to cool to room temperature and is then treated with 4.2 g. of ethyl 2-bromo-isobutyrate in 10 ml. of xylene. The reaction mixture is refluxed while stirring for six hours and is then cooled to room temperature and treated with 2 ml. of ethanol. The inorganic precipitate is filtered off, the filtrate is evaporated to dryness. The residue is taken up in diethyl ether; the organic solution is washed with water and a saturated sodium chloride solution, dried over sodium sulfate and evaporated to dryness to yield 11.6 g. of the oily ethyl 2 - [4 - (2-phenyl-1,2,3,4-tetrahydro-1-naphthyl)-phenyloxy]-isobutyrate of the formula:

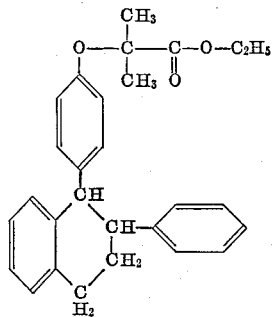

which is purified by chromatography on 340 g. of aluminum oxide (neutral, activity III). The desired product is eluted as a colorless oil with a 9:1-mixture of hexane and benzene, a 4:1-mixture of hexane and benzene and a 1:1-mixture of hexane and benzene, and crystallizes spontaneously. It melts at 83–84° after recrystallization from a mixture of diethyl ether and petroleum ether.

The starting material used in the above procedure is prepared as follows: A mixture of 44.8 g. of 2-phenyl-1,2,3,4-tetrahydro-naphthalene-1-ol and 18.8 g. of phenol in 100 ml. of a 1:1-mixture of benzene and hexane is treated dropwise over a period of two hours with a solution of 13.3 g. of aluminum chloride in 37.6 g. of phenol while stirring and cooling in an ice-bath to 5–10°. The ice-bath is then removed and stirring is continued at room temperature for twelve hours; after standing for sixty hours, the reaction mixture is again stirred for four hours at about 38–40°, and is then poured onto a mixture of 100 g. of ice and 100 ml. of concentrated hydrochloric acid. A total of 50 ml. of diethyl ether is added; the organic layer is separated, and the aqueous mixture is extracted with two additional portions of diethyl ether. The combined ether extracts are washed twice with aqueous solutions of sodium acetate, dried over sodium sulfate, filtered and evaporated to dryness. The excess of phenol is removed by distillation (collected at 75°/13 mm. and a bath temperature of 170°), to leave 66.5 g. of a glassy residue.

The latter is dissolved in the same amount of diethyl ether and poured slowly into 500 ml. of a 10 percent aqueous solution of sodium hydroxide while stirring and keeping it at 50°. The diethyl ether evaporates, and the precipitate is filtered off to yield 66.0 g. of the sodium salt of 1-(4-hydroxy-phenyl)-2-phenyl-1,2,3,4-tetrahydro-naphthalene, which is suspended in water acidified with 2 N hydrochloric acid. The organic material is extracted with three portions of diethyl ether; the organic solutions are combined, washed with water, an aqueous solution of sodium acetate, and an aqueous solution of sodium chloride, dried over sodium sulfate, and evaporated to dryness, yield: 51.0 g. The resulting 1-(4-hydroxy-phenyl)-2-phenyl-1,2,3,4-tetrahydro-naphthalene is crystallized from 100 ml. of hexane and about 2 ml. of diethyl ether. A first crop (yield: 20.5 g.) melts at 68–71°, and the second crop (yield: 9.2 g.) melts at 66–70°; a total of 17.3 g. of a glassy residue can be obtained from the mother liquors.

The crystalline material has one-half mole of diethyl ether of crystallization, which is eliminated by distillation and collecting the 1-(4-hydroxy-phenyl)-2-phenyl-1,2,3,4-tetrahydro-naphthalene at 186–190°/0.1 mm.

EXAMPLE 2

A mixture of 10.4 g. of ethyl 2-[4-(2-phenyl-1,2,3,4-tetrahydro-1-naphthyl)-phenoxy]-isobutyrate and 50 ml. of methanol is added to a solution of 1.7 g. of potassium hydroxide in 30 ml. of methanol, and the reaction mixture is allowed to stand at room temperature for sixty hours. The solvent is then evaporated under reduced pressure. The residue is dissolved in water; the aqueous solution is washed with diethyl ether and is then acidified with 15 ml. of 2 N hydrochloric acid. The organic material is extracted with diethyl ether; the organic extracts are combined and washed with a saturated aqueous solution of sodium chloride, dried over sodium sulfate and evaporated to dryness to yield the 2-[4-(2-phenyl-1,2,3,4-tetrahydro-1-naphthyl)-phenoxy]-isobutyric acid of the formula:

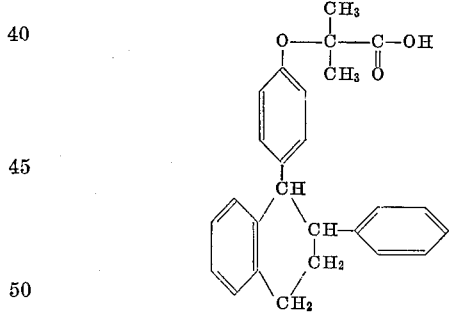

M.P. 134–136°.

EXAMPLE 3

The following compounds are prepared according to the previously described and illustrated procedure by selecting the appropriate starting materials:

| Starting material | Reagents | Product |
| --- | --- | --- |
| 1-(4-hydroxy-phenyl)-2-phenyl-1,2,3,4-tetrahydro-naphthalene. | Sodium hydride+ methyl 2-bromo-isobutyrate. | Methyl 2-[4-(2-phenyl-1,2,3,4-tetrahydro-1-naphthyl)-phenyloxy]-isobutyrate. |
| 2-(4-chloro-phenyl)-1-(4-hydroxy-phenyl)-1,2,3,4-tetrahydro-naphthalene. | Sodium hydride+ ethyl 2-bromo isobutyrate. | Ethyl 2-{4-[2-(4-chloro-phenyl)-1,2,3,4-tetrahydro-1-naphthyl]-phenyloxy}-isobutyrate. |
| 1-(3-chloro-4-hydroxy-phenyl)-2-phenyl-1,2,3,4-tetrahydro-naphthalene. | ____do____ | Ethyl 2-[2-chloro-4-(2-phenyl-1,2,3,4-tetrahydro-1-naphthyl)-phenyloxy]-isobutyrate. |
| 1-(4-hydroxy-phenyl)-7-methyl-2-(4-methyl-phenyl)-1,2,3,4-tetrahydro-naphthalene. | ____do____ | Ethyl 2-{4-[7-methyl-2-(4-methyl-phenyl)-1,2,3,4-tetrahydro-1-naphthyl]-phenyloxy}-isobutyrate. |
| 7-chloro-1-(4-hydroxy-phenyl)-2-phenyl-1,2,3,4-tetrahydro-naphthalene. | ____do____ | Ethyl 2-[4-(7-chloro-2-phenyl-1,2,3,4-tetrahydro-1-naphthyl)-phenyloxy]-isobutyrate. |

| Starting material | Reagents | Product |
|---|---|---|
| 1-(4-hydroxy-3-methyl-phenyl)-2-phenyl-1,2,3,4-tetrahydro-naphthalene. | Sodium hydride+ ethyl 2-bromo-2-methyl-butyrate. | Ethyl 2-[2-methyl-4-(2-phenyl-1,2,3,4-tetrahydro-1-naphthyl)-phenyloxy]-butyrate. |
| 1-(4-hydroxy-phenyl)-2-phenyl-1,2,3,4-tetrahydro-naphthlene. | Sodium hydride+ ethyl 1-bromo-cyclohexane carboxylate. | Ethyl 1-[4-(2-phenyl-1,2,3,4-tetrahydro-1-naphthyl)-phenyloxy]-cyclohexane carboxylate. |
| 1-(4-hydroxy-phenyl)-2-phenyl-indane. | Sodium hydride+ ethyl 2-bromo-isobutyrate. | Ethyl 2-[4-(2-phenyl-1-indanyl)-phenyloxy]-isobutyrate. |
| 1-(4-hydroxy-phenyl)-2-phenyl-1-benzsuberane. | -----do----------- | Ethyl 2-[4-(2-phenyl-1-benzsuberyl)-phenyloxy]-isobutyrate. |
| 2-(4-hydroxy-phenyl)-1-phenyl-1,2,3,4-tetrahydro-naphthalene. | -----do----------- | Ethyl 2-[4-(1-phenyl-1,2,3,4-tetrahydro-2-naphthyl)-phenyloxy]-isobutyrate. |
| 1-(3,4-dihydroxy-phenyl)-2-phenyl-1,2,3,4-tetrahydro-naphthalene. | -----do----------- | 1-[3,4-di-(2-carbethoxy-2-propyloxy)-phenyl]-2-phenyl-1,2,3,4-tetrahydro-naphthalene. |
| 1-(4-hydroxy-phenyl)-2-(3-pyridyl)-1,2,3,4-tetrahydro-naphthalene. | -----do----------- | Ethyl 2-{4-[2-(3-pyridyl)-1,2,3,4-tetrahydro-naphthyl]-phenyloxy}-isobutyrate. |
| Ethyl 2-4-[2-(4-chloro-phenyl)1,2,3,4-tetrahydro-1-naphthyl]-phenyloxy]-isobutyrate. | Potassium hydroxide in ethanol. | 2-{4-[2-(4-chloro-phenyl)-1,2,3,4-tetrahydro-1-naphthyl]-phenyloxy}-isobutyric acid. |
| Ethyl 2-[2-chloro-4-(2-phenyl-1,2,3,4-tetrahydro-1-naphthyl)-phenyloxy]-isobutyrate. | -----do----------- | 2-[2-chloro-4-(2-phenyl-1,2,3,4-tetrahydro-1-naphthyl)-phenyloxy]-isobutyric acid. |
| Ethyl 2-[2-methyl-4-(2-phenyl-1,2,3,4-tetrahydro-1-naphthyl)-phenyloxy]-isobutyrate. | -----do----------- | 2-[2-methyl-4-(2-phenyl-1,2,3,4-tetrahydro-1-naphthyl)-phenyloxy]-isobutyric acid. |
| Ethyl 2-{4-[7-methyl-2-(4-methyl-phenyl)-1,2,3,4-tetrahydro-1-naphthyl]-phenyloxy}-isobutyrate. | Potassium hydroxide in methanol. | 2-{4-[7-methyl-2-(4-methyl-phenyl)-1,2,3,4-tetrahydro-1-naphthyl]-phenyloxy}-isobutyric acid. |
| Ethyl 2-[4-(7-chloro-2-phenyl-1,2,3,4-tetrahydro-1-naphthyl)-phenyloxy]-isobutyrate. | Potassium hydroxide in ethanol. | 2-[4-(7-chloro-2-phenyl-1,2,3,4-tetrahydro-1-naphthyl)-phenyloxy]-isobutyric acid. |
| Ethyl 1-[4-(2-phenyl-1,2,3,4-tetrahydro-1-naphthyl)-phenyloxy]-cyclohexane carboxylate. | Potassium hydroxide in methanol. | 1-[4-(2-phenyl-1,2,3,4-tetrahydro-1-naphthyl)-phenyloxy]-cyclohexane carboxylic acid. |
| Ethyl 2-[4-(2-phenyl-1-indanyl)-phenyloxy]-isobutyrate. | Potassium hydroxide in ethanol. | 2-[4-(2-phenyl-1-indanyl)-phenyloxy]-isobutyric acid. |
| Ethyl 2-[4-(2-phenyl-1-benzsuberyl)-phenyloxy]-isobutyrate. | Potassium hydroxide in methanol. | 2-[4-(2-phenyl-1-benzsuberyl)-phenyloxy]-isobutyric acid. |
| Ethyl 2-[4-(1-phenyl-1,2,3,4-tetrahydro-2-naphthyl)-phenyloxy]-isobutyrate. | -----do----------- | 2-[4-(1-phenyl-1,2,3,4-tetrahydro-2-naphthyl)-phenyloxy]-isobutyric acid. |
| 1-[3,4-di-(2-carbethoxy-2-propyloxy)-phenyl]-2-phenyl-1,2,3,4-tetrahydro-naphthalene. | -----do----------- | 1-[3,4-di-(2-carboxy-2-propyloxy)-phenyl]-2-phenyl-1,2,3,4-tetrahydro-naphthalene. |
| 2-[4-(2-phenyl-1,2,3,4-tetrahydro-1-naphthyl)-phenyloxy]-isobutyric acid. | 2-N,N-diethyl-aminoethyl chloride hydrochloride+ potassium carbonate. | 2-N,N-diethylamino-ethyl 2-[4-(2-phenyl-1,2,3,4-tetrahydro-1-naphthyl)-phenyloxy]-isobutyrate. |
| Do--------------- | 2-(1-piperidino)-ethyl chloride hydrochloride+ potassium carbonate. | 2-(1-piperidino)-ethyl-2-[4-(2-phenyl-1,2,3,4-tetrahydro-1-naphthyl)-phenyloxy]-isobutyrate. |
| Do--------------- | 2-methoxyethanol +sulfuric acid. | 2-methoxyethyl 2-[4-(2-phenyl-1,2,3,4-tetrahydro-1-naphthyl)-phenyloxy]-isobutyrate. |

EXAMPLE 4

33.5 g. of trans-1-(4-hydroxy-phenyl)-2-(4-chlorophenyl)-1,2,3,4-tetrahydro-naphthalene are dissolved in 200 ml. of acetone and the solution is stirred and gently refluxed together with 8.0 g. of sodium hydroxide pellets. To this mixture is added dropwise a solution of 10.0 g. of monochloro-acetic acid in 50 ml. of acetone in a course of 30 minutes during which the reaction mixture becomes a slurry. After completed addition reflux and stirring is continued for 1 more hour and the reaction mixture is allowed to stand for 20 hours. Thereupon reflux and stirring is returned for 1 hour and thereafter the acetone is removed under reduced pressure. The solid residue is dissolved in 1 liter of water and extracted two times with diethyl ether. Upon evaporation the extract yields a partly crystalline oil, which is discarded. The clear aqueous layer is acidified with concentrated hydrochloric acid and extracted two times with diethyl ether. The combined extracts are washed with water, saturated sodium chloride solution, dried over sodium sulfate, filtered and evaporated to dryness. The residue is crystallized from diethyl ether-hexane, thereupon from ethylacetate-petroleum ether and finally from ethanol-water to yield the trans-{4-[2-(4-chloro-phenyl)-1,2,3,4-tetrahydro-1-naphthyl]-phenoxy}-acetic acid having the formula:

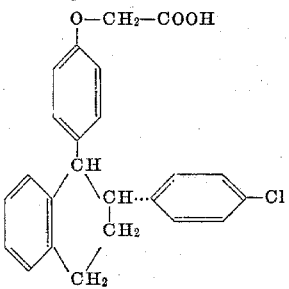

and melting at 176–177°.

EXAMPLE 5

10 g. of trans-1-(4-hydroxy-phenyl)-2-(4-chloro-phenyl) - 1,2,3,4 - tetrahydro-naphthalene (M.P. 141–142.5°) are dissolved in 100 ml. of acetone, 7.0 g. of sodium hydroxide pellets are added and the whole is heated to gentle reflux with stirring. Then 4.5 g. of chloroform are added dropwise with stirring (20 minutes) and heating and stirring is continued for 2 more hours. To the white paste formed 300 ml. of ice water are added and the acetone is removed under reduced pressure. The clear aqueous solution is acidified with concentrated hydrochloric acid and extracted twice with diethyl ether. The extracts are washed with water, two times with saturated ammonium chloride solution, dried, filtered and evaporated to dryness. The glasslike solid, crude product is recrystallized from benzene-petroleum ether to yield the trans-2-{4-[2-(4-chloro-phenyl)-1,2,3,4-tetrahydro - 1 -naphthyl]-phenoxy}-isobutyric acid of the formula:

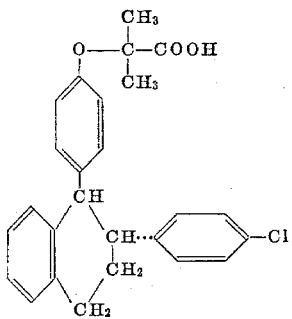

melting at 126–128°.

EXAMPLE 6

27.2 g. of trans-1-(4-hydroxy-phenyl)-2-(4-chloro-phenyl)-1,2,3,4-tetrahydro-naphthalene are dissolved in 200 ml. of acetone with stirring at room temperature. 18.0 g. of sodium hydroxide pellets are added to the clear solution. The reaction mixture is stirred and heated at reflux for 10 minutes. External heating is removed and 12.0 g. of chloroform are added dropwise at a rate to maintain reflux. A precipitate is formed and after completed addition, heating is resumed and 400 ml. of acetone are added to facilitate stirring and refluxing which is continued for 2 more hours (58° C.). The batch is then cooled in an ice-salt bath (5°) for 15 minutes. The tan precipitate is collected and washed with acetone. This precipitate is then dissolved in 400 ml. water; the solu tion is made acidic (pH 2) with 25 ml. concentrated hydrochloric acid and extracted with 3×100 ml. methylene chloride. The combined extracts are washed with 1×150 ml. saturated sodium chloride solution, dried over anhydrous magnesium sulfate and evaporated. The residue is recrystallized from benzene-petroleum ether to yield the trans-2-{4-[2-(4-chloro-phenyl)-1,2,3,4-tetrahydro-1-naphthyl]-phenoxy}-isobutyric acid with is identical with that obtained according to Example 5.

EXAMPLE 7

A mixture of 36.50 g. of trans-2-{4-[2-(4-chloro-phenyl)-1,2,3,4-tetrahydro - 1 - naphthyl]-phenoxy}-isobutyric acid, 100 ml. ethanol and 2.0 ml. concentrated sulfuric acid is refluxed for 4 hours. The dark yellow reaction mixture is then treated with water and extracted with methylene chloride. The combined extracts are washed with sodium carbonate solution and stripped to dryness leaving an oily product. It is recrystallized from acetone-hexane to give rod-like crystals of the trans-{4-[2-(4-chloro-phenyl)-1,2,3,4-tetrahydro-1-naphthyl] - phenoxy}-isobutyric acid ethyl ester having the formula:

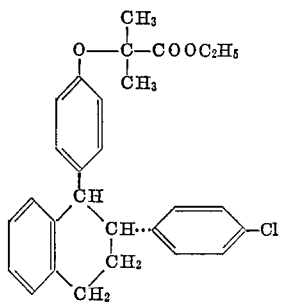

and melting at 115–116°.

EXAMPLE 8

In the manner described in the previous examples the following compounds can be prepared by reacting equivalent amounts of the corresponding reagents: 1-(3-carboxyethoxy-phenyl)-2-(4 - methoxy-phenyl)-1,2,3,4-tetrahydro-naphthalene, 1-(4-carboxymethoxy-3-methyl-phenyl)-2-(3 - methyl - phenyl)-6-methoxy-1,2,3,4-tetrahydro-naphthalene, 1 - (2 - carboxymethoxy-4-chloro-phenyl)-2-phenyl-1,2,3,4-tetrahydro-naphthalene, 1 - (4-carboxymethoxy-phenyl)-2-(4-chloro-phenyl)-indane, 1-(4-carboxymethoxyphenyl)-2-(4-chloro-phenyl - benzo-cycloheptane, 1-(4-carboxymethoxy-phenyl)-2-(4-chloro - phenyl)-7-trifluoromethyl-1,2,3,4-tetrahydro-naphthalene,1-(4-carboxymethoxy-phenyl)-2-(4-chloro-phenyl) - 3,3 - dimethyl-indane, 1-(4-carboxymethoxy-phenyl)-2-(4-chloro-phenyl)-1,4,5-trimethyl-1,2,3,4-tetrahydro - naphthalene, 1-(4-carboxymethoxy-phenyl) - 2 - (4-chloro-phenyl)-8-methoxy-1,2,3,4-tetrahydro-naphthalene, 1-[4-(1-carboxy-ethoxy)-phenyl]-2-(3-methoxy - phenyl)-1,2,3,4-tetrahydro-naphthalene, 1-[4-(4 - carboxy - butoxy)-phenyl]-2-(3-bromo-phenyl)-6-methyl-1,2,3,4 - tetrahydro - naphthalene, 1-(4-carbamylmethoxy - phenyl)-2-phenyl-1,2,3,4-tetrahydro-naphthalene, 1,2-bis-(4-carbethoxymethoxy-phenyl)-1,2,3,4-tetrahydro-naphthalene, 1-(4-carboxyvinyloxy-phenyl)-2-(2-chloro-phenyl)-1,2,3,4-tetrahydro-naphthalene, 1-(4-N,N,-dimethylcarbamylmethoxy - phenyl)-2-phenyl-6-methoxy-indane, 1-(3 - cyanomethyl - phenyl)-2-(4-chloro-phenyl)-1,2,3,4-tetrahydro-naphthalene, 1-(4-carbethoxymethoxy-2-chloro-phenyl-2-(4-methoxy - phenyl)-1,2,3,4-tetrahydro-naphthalene and 1-(3-carboxymethoxy-5-methoxy-phenyl) - 2 - (3,4,5 - trimethoxy-phenyl)-6,7-dimethoxy-1,2,3,4-tetrahydro-naphthalene and the sodium salts of the acids above.

EXAMPLE 9

The solution of 5.7 g. 1-(4-hydroxy-phenyl)-2-phenyl-7-chloro-1,2,3,4-tetrahydro-naphthalene in 30 ml. acetone is stirred with 1.48 g. sodium hydroxide pellets and refluxed while a solution of 2.41 g. chloro-acetic acid in 30 ml. acetone is added dropwise over a 10 minute period and refluxing is continued for 2½ hours. The reaction mixture is evaporated to dryness in vacuo, to the residue diluted hydrochloric acid is added and the whole is extracted with diethyl ether. The extracts are washed several times with water, then with concentrated sodium-chloride solution, dried and evaporated. The brown oil crystallizes slowly in hexane-benzene (5:1) while stirring, to yield a first crop melting at 99–113°. After two recrystallizations from benzene-pentane the 4-(2-phenyl-7-chloro-1,2,3,4-tetrahydro-1-napthyl)-phenoxy-acetic acid of the formula:

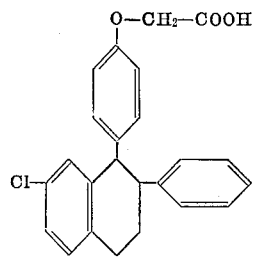

is obtained. Its melting point of 120–123° indicates that it is unitary and most likely has the trans-configuration.

The starting material is prepared as follows:

To the cooled and stirred solution of 17.0 g. 2-phenyl-7-chloro-tetralone in 41 ml. ethanol and 41 ml. tetrahydrofuran 1.62 g. sodium boron hydride are added. Stirring is continued at room temperature for 5 hours and hereupon the mixture is allowed to stand overnight. The excess hydride is decomposed with dilute acetic acid and the mixture is evaporated under reduced pressure. The residue is slurried in water and the yellow oil is collected; it crystallizes upon standing. The so-obtained 1-hydroxy-2-phenyl-7-chloro-1,2,3,4-tetrahydro - naphthalene is recrystallized once from aqueous ethanol and once from hexane, M.P. 84–86°.

13.2 g. thereof and 5.1 g. phenol are dissolved in 147 ml. benzene and 49 ml. hexane. This solution is added dropwise to a solution of 10.2 g. phenol and 3.42 g. aluminum chloride while stirring and cooling in ice bath. Stirring is continued at room temperature for 5 hours and at 50–55° for additional 5 hours. The reaction mixture is poured into 80 g. ice and 80 ml. concentrated hydrochloric acid and the whole is extracted several times with diethyl ether. The combined organic layer is washed several times with water, concentrated sodium chloride solution, dried, filtered and evaporated in vacuo to dryness. The excess phenol is distilled off in the vacuum of a waterjet pump and the oil, boiling at 183–193/12 mm. collected. It is redistilled and the fraction boiling at 193–215°/12 mm. collected. The so-obtained 1-(4-hydroxy - phenyl-2-phenyl-7-chloro-1,2,3,4-tetrahydro-naphthalene obviously constitutes a mixture of the cis- and trans-isomer; it is used as such in the final step.

EXAMPLE 10

4.0 g. 1-(4-hydroxy-phenyl)-2-(4-chloro-phenyl)-benzo-suberane are dissolved in 20 ml. acetone and the solution is stirred with 1.0 g. sodium hydroxide pellets at gentle reflux. The solution of 1.63 g. chloro-acetic acid in 20 ml. acetone is added dropwise over a 10 minute period. The reaction mixture is refluxed with stirring for 150 minutes, whereupon the sodium salt of the product precipitates as a white solid. It is collected and washed with acetone. The air dried salt is suspended in water, the suspension acidified with 2 N hydrochloric acid, and extracted 3 times with diethyl ether. The ethereal extracts are washed with saturated sodium chloride solution, dried, filtered and evaporated to dryness. The residual solid is recrystallized from benzene-pentane to yield the 4-[2-(4-chloro-phenyl)-1-benzosuberanyl]phenoxy-acetic acid of the formula:

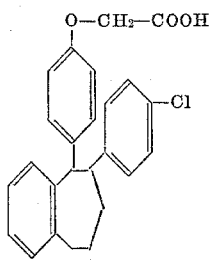

melting at 130–132°. NMR-evidence indicates that both aromatic substituents are in equatorial positions (trans-compound).

The starting material is prepared as follows:

91 g. p-chlorophenyl-acetonitrile are reacted at room temperature with 93 g. 1-chloro-3-phenyl-propane in the presence of 420 ml. dimethylformamide, 420 ml. toluene and 28.8 g. of a 56% suspension of sodium hydride in mineral oil. The reaction mixture is stirred for 5 hours then evaporated under reduced pressure. The residue is slurried with water and extracted into diethyl ether. The extract is washed with water, saturated sodium chloride solution, dried and evaporated. The residue is recrystallized from pentane to yield the α-(4-chloro-phenyl)-δ-phenyl-valeronitrile, M.P. 66–68°.

91.6 g. thereof are hydrolyzed by boiling it with 226 g. 50% sodium hydroxide solution in 340 ml. ethylene glycol for 5 hours. The reaction mixture is poured into 1.5 liters water giving a clear red solution. It is cooled in an ice bath and acidified with concentrated hydrochloric acid. The supernatant liquid is decanted and pentane added. The whole is filtered and the filter residue air-dried. The so-obtained α-(4-chloro-phenyl)-δ-phenyl-valeric acid is recrystallized from aqueous ethanol and melts at 104–105°.

79.5 g. thereof are dissolved in 150 ml. benzene and heated on a steam bath with 58 g. phosphor pentachloride. The benzene is removed in vacuo and 100 ml. benzene are added and again removed. This is repeated 2 times more. The remaining acid chloride is taken up in 178 ml. benzene and the solution added dropwise with stirring to 48.7 g. aluminum chloride suspended in 445 ml. benzene at room temperature. Stirring is continued for 5 hours and the reaction mixture is poured onto ice and concentrated hydrochloric acid. The organic layer is separated and the aqueous layer extracted 2 times with diethyl ether. The combined organic layers are washed with water and 2 N sodium carbonate solution, dried, filtered and evaporated to dryness. The remaining oil is distilled and the fraction boiling at 165–240°/0.3 mm. collected. It represents the 2-(4-chloro-phenyl)-1-benzosuberanone.

8.0 g. thereof in 50 ml. dry ethanol and 20 ml. tetrahydrofuran are reduced at room temperature with 0.8 g. sodium boron hydride. The reducing agent is added in portions and the reaction mixture is stirred at room temperature for 5 hours. The excess reducing agent is destroyed with dilute acetic acid and the reaction mixture is evaporated in vacuo. The residue is extracted 3 times with diethyl ether, the extracts washed with water, dried, filtered and evaporated to dryness. There is obtained the 2-(4-chloro-phenyl)-1-benzosuberanol as a straw-colored oil showing in the infrared spectrum a hydroxyl band at 3380 cm.$^{-1}$.

To a solution of 1.7 g. aluminum chloride in 5.0 g. phenol is added dropwise with stirring and cooling in an ice bath a solution of 6.8 g. 2-(4-chloro-phenyl)-benzosuberanol and 2.5 g. phenol in 73 ml. benzene and 24 ml. hexane. After completed addition (60 min.) stirring is continued at room temperature for another 5 hours at 55–60°. The reaction mixture is poured onto 50 g. ice and 50 ml. concentrated hydrochloric acid. The whole is extracted 3 times with diethyl ether. The extracts are washed with water and saturated sodium chloride solution, dried, filtered and evaporated to dryness. The phenol is distilled off at 150–170°/13 mm. and the fraction boiling at 215–240°/0.2 mm. collected. There is obtained the desired 1-(4 - hydroxy-phenyl)-2-(4-chloro-phenyl)-benzosuberane as a glasslike solid.

EXAMPLE 11

To the stirred solution of 9.6 g. 1α-(4-hydroxy-phenyl)-2α-phenyl-1,2,3,4-tetrahydro-naphthalene and 7.0 g. sodium hydroxide pellets in 100 ml. acetone, 4.5 g. chloroform are added dropwise while refluxing, and this is continued for 3 hours after completed addition. The sodium salt formed is collected, washed with acetone, air dried, suspended in water and the suspension acidified with hydrochloric acid. It is extracted with diethyl ether, benzene, ethyl acetate and again with ether, the combined extracts are washed with saturated sodium chloride solution, dried and evaporated. The remaining 2-[4-(2α-phenyl-1,2,3,4-tetrahydro-1α-naphthyl)-phenoxy]-isobutyric acid of the formula:

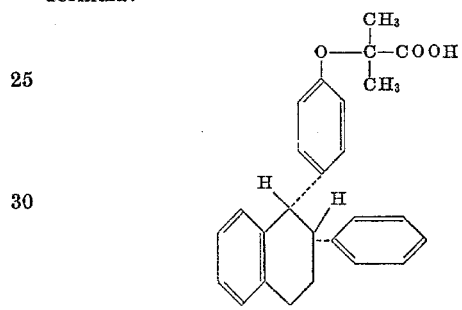

is recrystallized from n-hexane and melts at 157–159°.

The starting material is prepared as follows:

To a mixture of 2.4 g. magnesium turnings in 50 ml. diethyl ether are added a few drops of methyl iodide to initiate the formation of the Grignard reagent and then a solution of 19.0 g. 4-bromo-anisole in 50 ml. diethyl ether. The Grignard mixture is refluxed for two hours and, while cooling with ice, a solution of 6.7 g. 2-phenyl-1,2,3,4-tetrahydro-naphthalene-1-one in 50 ml. of diethyl ether is added dropwise. After the addition is completed refluxing is continued for another 3 hours and the reaction mixture is allowed to stand for 15 hours. It is then cooled with ice; the Grignard complex formed is broken and simultaneously dehydrated by adding 25 ml. of a saturated aqueous solution of ammonium chloride. The reaction mixture is poured into 200 ml. water, the organic solution separated, the aqueous layer extracted twice with diethyl ether and the organic extracts are combined, washed with water, dried and evaporated. The resulting 1-(4-methoxy-phenyl)-2-phenyl-3,4-dihydro-naphthalene melts at 129–130° after recrystallization from benzene-n-pentane.

1.2 g. 10% palladium-charcoal in 100 ml. ethyl acetate are saturated with hydrogen at atmospheric pressure. To the suspension the solution of 5.4 g. 1-(4-methoxy-phenyl)-2-phenyl-3,4-dihydro-naphthalene in 50 ml. ethyl acetate is added and the whole is allowed to hydrogenate at atmospheric pressure until the hydrogen uptake has stopped. Thereupon the catalyst is filtered off, the filtrate evaporated under reduced pressure, the residue mixed with water and the mixture extracted with diethyl ether. The dried extract is evaporated and the viscous oil obtained recrystallized from 2-propanol to yield pure 1α-(4-methoxy-phenyl) - 2α - phenyl - 1,2,3,4 - tetrahydro-naphthalene melting at 87–89°.

A solution of 10 ml. pyridine in 12 ml. concentrated hydrochloric acid is distilled until the vapors reach a temperature of about 200°. 1.0 g. 1α-(4-methoxy-phenyl)-2α-phenyl-1,2,3,4-tetrahydro-naphthalene is added to the melt obtained and the mixture is refluxed for one hour at a bath temperature of 250°. The cooled reaction mixture is diluted with water, the aqueous phase decanted, the residue taken up in benzene, the organic phase is separated, washed with water, dried and evaporated. The so-obtained 1α - (4 - hydroxy-phenyl) - 2α - phenyl-1,2,3,4-tetrahydro-naphthalene melts upon recrystallization from hexane at 142–143°.

EXAMPLE 12

The mixture of 5.0 g. 2-[4-(2-phenyl-3,4-dihydro-1-naphthyl)-phenoxy]-isobutyric acid, 1.0 g. 10% palladium-charcoal and 200 ml. 95% ethanol is hydrogenated at atmospheric pressure until one mol equivalent of hydrogen is absorbed. Hereupon it is filtered, the filtrate concentrated to about 25 ml. and upon addition of 5 ml. water the 2-[4-(2α-phenyl - 1,2,3,4 - tetrahydro-1α-naphthyl)-phenoxy]-isobutyric acid crystallizes and is recrystallized from n-hexane, M.P. 159–161°; it is identical with the product obtained according to Example 11.

The starting material can be prepared analogous to the procedure described in Example 10 but replacing the phenol used by the equivalent amount of 1-(4-hydroxy-phenyl)-2-phenyl-3,4-dihydro-naphthalene which is obtained from the corresponding 1-(4-methoxy-phenyl)-2-phenyl-3,4-dihydro-naphthalene by the analogous hydrolysis procedure described in Example 10 for the tetrahydro-naphthalene derivative.

EXAMPLE 13

Preparation of 2000 tablets each containing 0.5 g. of the active ingredient:

Ingredients:
```
Trans - 4 - [2 - (4 - chloro - phenyl)-1,2,3,4-
  tetrahydro - 1 - naphthyl] - phenoxy-acetic
  acid _____g__ 1000.0
Sterotex _____g__   88.0
Alginic acid _____g__   42.0
Cellulose acetate phthalate _____g__  300.0
Anhydrous ethanol _____ml__  332.0
Acetone _____ml__  332.0
```

Procedure

The acetic acid derivative, sterotex and alginic acid are passed through a 20 mesh screen and mixed for 30 minutes. The phthalate is dissolved in the ethanol-acetone mixture and with the solution the powders are wetted and mixed thoroughly. The granulate is dried with warm air, passed through a 16 mesh screen and compressed into tablets using 13/32″ diameter dies, modified ball punches.

EXAMPLE 14

Preparation of 1000 tablets each containing 0.755 g. of the active ingredient:

Ingredients: G.
```
2 - [4 - (2 - phenyl - 1,2,3,4 - tetrahydro-1-
  naphthyl)-phenoxy]-isobutyric acid _____  755.0
Microcrystalline cellulose _____  109.0
Polyethylene glycol 6000 powder _____   18.0
Polyvinyl alcohol powder _____   18.0
50% aqueous ethanol, q.s.
```

Procedure

The acid and polyvinyl alcohol are passed through a 20 mesh screen, mixed with the cellulose and the mixture is moistened with ethanol. The granulate is dried with warm air, passed through a 12 mesh screen, mixed with the polyethylene glycol and compressed into tablets using 14/32″ diameter dies, modified ball punches. In one tablet shown in this and the foregoing example, the active ingredient may be replaced by 400 mg. of the other compounds of this invention described in the previous and following examples.

EXAMPLE 15

To the refluxing solution of 6.6 g. 1-(4-hydroxy-phenyl)-4-phenyl - 1,2,3,4 - tetrahydro-naphthalene in 50 ml. xylene, 0.51 g. sodium are added in small pieces. After 2½ hours reflux 4.5 g. ethyl 2-bromo-isobutyrate in 4 ml. xylene are added to the suspension formed and it is refluxed 4 hours more. After cooling 2 ml. methanol are added to the mixture which is then filtered and the residue washed with methanol. The filtrate is evaporated in vacuo the residue mixed with water and the mixture extracted with ethyl acetate. The dried extract is evaporated in vacuo yielding the oily ester. It is dissolved in 50 ml. methanol, to the solution 1.5 g. potassium hydroxide in 25 ml. methanol are added and the mixture is allowed to stand at room temperature over the weekend. Thereupon it is evaporated under reduced pressure, to the residue water and diethyl ether are added and the whole is refluxed until dissolution occurs. The aqueous layer is acidified with hydrochloric acid, extracted with diethyl ether, the extract washed with water and concentrated sodium chloride solution, dried and evaporated in vacuo. The residue is recrystallized from hexane-diethyl ether and aqueous ethanol to yield the 2-[4-(4-phenyl-1,2,3,4-tetrahydro-1-naphthyl)-phenoxy]-isobutyric acid of the formula:

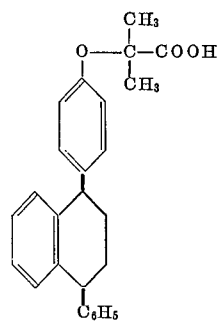

melting at 149–151°. The starting material is prepared as follows:

The solution of 11.1 g. of 1-hydroxy-4-phenyl-1,2,3,4-tetrahydro-naphthalene and 4.95 g. phenol in 145 ml. benzene and 48 ml. hexane is added dropwise to a solution of 10 g. phenol and 3.36 g. aluminum chloride while cooling in an ice bath and stirring. Stirring is continued for 5 hours at room temperature and for 5 hours at 55–60°. Hereupon the cold mixture is poured onto 100 g. ice and 100 ml. concentrated hydrochloric acid and extracted with diethyl ether. The extract is washed with water until neutral, dried, filtered and evaporated in vacuo. The residue is distilled and the fraction boiling at 195 to 215°/0.15 mm. collected. The so-obtained 1-(4-hydroxy-phenyl) - 4 - phenyl-1,2,3,4-tetrahydro-naphthalene is recrystallized from hexane-benzene and melts at 147–149°.

EXAMPLE 16

To the stirred and refluxing solution of 10.0 g. 1β-(4-hydroxy-phenyl) - 2α - phenyl-1,2,3,4-tetrahydronaphthalene (M.P. 67–69°) in 100 ml. acetone containing 3.3 g. sodium hydroxide, the solution of 4.5 g. chloro-acetic acid in 30 ml. acetone is added dropwise and the mixture is refluxed for 7 hours and allowed to stand overnight. The crystalline precipitate is filtered off, dissolved in water, the solution acidified with 2 N hydrochloric acid, extracted with ethyl acetate, the extract washed with water, dried and evaporated. The remaining 4-(2α-phenyl-1,2,3,4-tetrahydro - 1β - naphthyl)-phenoxy-acetic acid of the formula:

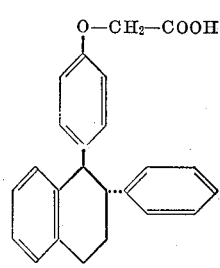

19 is recrystallized first from hexane, then from benzene-pentane and finally from aqueous ethanol and melts at 124–126°.

EXAMPLE 17

To the stirred and refluxing solution of 30.0 g. 1α-(4-hydroxy-phenyl)-2α-phenyl - 1,2,3,4 - tetrahydronaphthalene (M.P. 138–140°) in 200 ml. acetone containing 10.0 g. sodium hydroxide, the solution of 14.0 g. chloro-acetic acid in 50 ml. acetone is added dropwise. Hereupon 200 ml. acetone are added and the mixture is refluxed for 2 hours and allowed to stand overnight. The precipitate formed is collected, dissolved in water, the solution acidified with 2 N hydrochloric acid and extracted with ethyl acetate. The extract is washed with water, dried and evaporated to yield the 4-(2α-phenyl-1,2,3,4-tetrahydro-1α-naphthyl)-phenoxy-acetic acid of the formula:

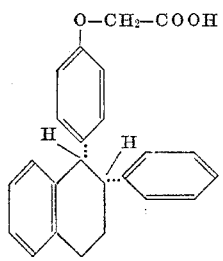

which melts after recrystallization from benzene-pentane and aqueous ethanol at 134–135°.

EXAMPLE 18

The mixture of 2.0 g. 1-(4-hydroxy-phenyl)-2-methyl-2-(4-chloro-phenyl)-1,2,3,4-tetrahydro-naphthalene, 0.51 g. sodium hydroxide and 10 ml. acetone is stirred for 15 minutes, whereupon 0.82 g. chloro-acetic acid in 10 ml. acetone are added dropwise. It is refluxed and stirred for 2½ hours, then cooled, diluted with 25 ml. acetone and filtered. The precipitate is dissolved in 25 ml. warm water, the solution acidified with concentrated hydrochloric acid, extracted with ethyl acetate, the extract washed with water, dried and evaporated. The so-obtained 4-[2-methyl - 2 - (4-chloro-phenyl)-1,2,3,4-tetrahydro-1-naphthyl]-phenoxy-acetic acid of the formula

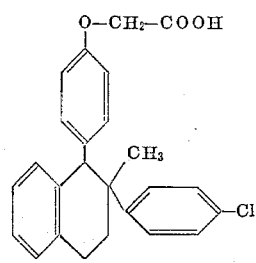

crystallizes on standing over pentane and melts after 2 recrystallizations from benzene-hexane at 102–106°.

EXAMPLE 19

The solution of 4.0 g. 2-{4-[2-(2-fluoro-phenyl)-3,4-dihydro-1-naphthyl]-phenoxy}-acetic acid in 50 ml. acetic acid is hydrogenated in the presence of 1.0 g. 10% palladium-charcoal at room temperature and atmospheric pressure until one mol equivalent of hydrogen is absorbed. The catalyst is then filtered off and the filtrate evaporated in vacuo. The residue is dissolved in diethyl ether, the solution extracted with aqueous sodium bicarbonate, the aqueous layer acidified with hydrochloric acid and extracted with diethyl ether. The extract is washed with water and brine, dried, filtered, and evaporated to

20 yield the cis-2-{4-[2-(2-fluoro-phenyl)-1,2,3,4-tetrahydro-1-naphthyl]-phenoxy}-acetic acid of the formula:

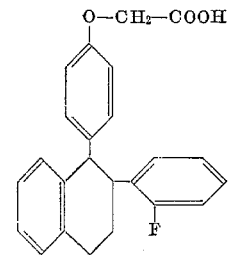

showing in the NMR-spectrum a doublet at 256 cps. ($I_{1,2}=5.5$ cps.).

The starting material is prepared as follows: To the Grignard reagent prepared from 4.0 g. magnesium, 31.2 g. 4-bromo-anisole in 220 ml. diethyl ether, 20.0 g. 2-(2-fluoro-phenyl)-tetralone in 330 ml. diethyl ether are added and the mixture refluxed for 5 hours. The complex formed is decomposed with diluted hydrochloric acid, the whole extracted with diethyl ether, the extract evaporated and the residue boiled for 30 minutes in 300 ml. concentrated hydrochloric acid. Upon cooling, it is extracted with diethyl ether, the extract evaporated and the residue recrystallized from hexane and twice from aqueous ethanol to yield the 1-(4-methoxy-phenyl)-2-(2-fluoro-phenyl)-3,4-dihydro-naphthalene melting at 113–115°.

5.5 g. thereof are heated in a melt prepared from 42 g. pyridine and 50 ml. concentrated hydrochloric acid, to 245–253° for 30 minutes. The mixture is poured onto ice, the precipitate collected and recrystallized from hexane to yield the 1-(4-hydroxy-phenyl)-2-(2-fluoro-phenyl)-3,4-dihydro-naphthalene melting at 96–98°.

The mixture of 3.65 g. thereof, 20 ml. acetone and 1.0 g. sodium hydroxide is refluxed until dissolution occurs. Hereupon the solution of 1.64 g. chloroacetic acid in 20 ml. acetone is added dropwise during 20 minutes. The mixture is refluxed for 3 hours, evaporated in vacuo, and the residue mixed with water. The suspension is extracted with diethyl ether, and the aqueous layer acidified with hydrochloric acid. It is extracted with diethyl ether, the extract washed with brine, dried, filtered, and evaporated. The residue is recrystallized from benzene-pentane to yield the 2-{4-[2-(2-fluoro-phenyl)-3,4-dihydro-1-naphthyl]-phenoxy}-acetic acid melting at 169–170°.

EXAMPLE 20

To the mixture of 8.1 g. trans-1-(4-hydroxy-phenyl)-2-(2-fluoro-phenyl) - 1,2,3,4 - tetrahydro-naphthalene, 45 ml. acetone and 2.2 g. sodium hydroxide, the solution of 3.6 g. chloroacetic acid in 45 ml. acetone is added dropwise during 20 minutes. The mixture is refluxed for 2½ hours, then evaporated and the residue dissolved in water. The solution is acidified with hydrochloric acid and extracted with diethyl ether. The extract is washed with water and brine, dried, filtered, and evaporated. The residue is dissolved in diethyl ether, the solution extracted with aqueous sodium bicarbonate, the aqueous layer acidified with hydrochloric acid and extracted with diethyl ether. The extract is washed with water and brine, dried, filtered, and evaporated to yield the trans-2-{4-[2-(2-fluoro-phenyl) - 1,2,3,4 - tetrahydro-1-naphthyl]-phenoxy}-acetic acid of the formula:

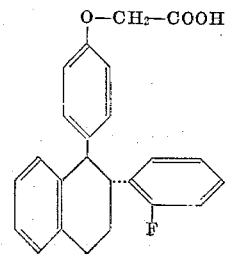

melting at 133–136° after recrystallization from benzene-pentane.

The starting material is prepared as follows: The mixture of 2-(2-fluoro-phenyl)-tetralone, 1.85 g. sodium borohydride, 100 ml. ethanol and 40 ml. tetrahydrofuran is refluxed and stirred overnight. Hereupon it is evaporated in vacuo, the residue taken up in diluted acetic acid, the mixture extracted with diethyl ether and the extract evaporated to yield the 2-(2-fluoro-phenyl)-tetralol.

The mixture of 14.6 g. thereof, 177 ml. benzene, 58 ml. hexane and 6.0 g. phenol is added dropwise with stirring to the cooled solution of 6.1 g. aluminum chloride in 12.1 g. phenol. The mixture is stirred at room temperature for 5 hours, allowed to stand 15 hours and finally stirred at 55–60° for 5 hours. It is then poured onto 100 g. ice and 100 ml. concentrated hydrochloric acid, the mixture extracted with diethyl ether, the extract evaporated and the excess phenol distilled off at 185°/15 mm. Hg. The residue is dissolved in 2 N sodium hydroxide, the solution clarified with charcoal, filtered and the filtrate acidified with hydrochloric acid. The precipitate formed is filtered off and recrystallized from aqueous ethanol to yield the trans-1-(4-hydroxy-phenyl)-2-(2-fluoro-phenyl)-1,2,3,4-tetrahydro-naphthalene melting at 120–121°.

EXAMPLE 21

To the solution of 4.0 g. trans-1-(4-hydroxy-phenyl)-2-(4-methoxy-phenyl) - 1,2,3,4 - tetrahydro-naphthalene, 1.05 g. sodium hydroxide and 24 ml. acetone, the solution of 1.71 g. chloroacetic acid in 21.4 ml. acetone is added dropwise during 10 minutes while stirring. The mixture is refluxed for 3 hours, evaporated in vacuo, and to the residue water and 2 N sodium hydroxide are added. The whole is extracted with diethyl ether, the aqueous layer acidified with 2 N hydrochloric acid and extracted with diethyl ether. The extract is washed with sodium and brine, dried, filtered and evaporated. To the residue hexane is added, and while refluxing the mixture crystallization occurs. The crystals formed are filtered off and recrystallized from aqueous ethanol to yield the trans-2-{4-[2-(4-methoxy-phenyl) - 1,2,3,4 - tetrahydro-1-naphthyl]-phenoxy}-acetic acid of the formula:

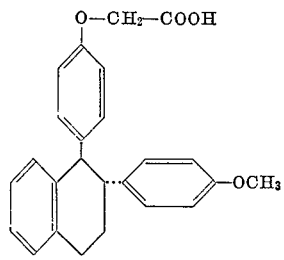

melting at 158–160°.

EXAMPLE 22

The mixture of 12.0 g. trans-2-{4-[2-(4-chloro-phenyl)-1,2,3,4-tetrahydro-1-naphthyl]-phenoxy}-acetic acid and 50 ml. thionyl chloride is refluxed for 40 minutes and evaporated. To the residue 2 times 50 ml. benzene are added which are boiled off. The residue is taken up in 80 ml. benzene and the solution split into two 40 ml. batches (A and B). To batch A, the solution of 4.4 g. 2-diethylamino-ethylamine in 10 ml. benzene is added dropwise while cooling and stirring and thereupon the mixture is refluxed for 90 minutes. It is allowed to stand overnight and refluxed the other day again for 90 minutes. It is evaporated in vacuo, and 6.5 g. of the residue dissolved in 20 ml. benzene-hexane (1:1). The solution is chromatographed on 200 g. aluminum oxide (neutral, activity III) and eluted with first 360 ml. benzene-hexane (1:1), then 3 times with 100 ml. benzene-hexane (2:1), 3 times with 100 ml. benzene, 2 times with 100 ml. benzene-diethyl ether (10:1), and 100 ml. benzene-diethyl ether (3:1). The latter 3 fractions are combined, evaporated, the residue taken up with acetone and the solution acidified with ethereal hydrochloric acid to yield the amorphous trans-2-{4-[2-(4 - chlorophenyl)-1,2,3,4-tetrahydro-1-naphthyl]-phenoxy}-acetic acid 2-diethylamino-ethylamide hydrochloride of the formula:

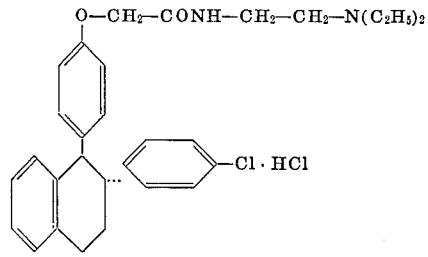

melting at 120–130°.

To the batch B the mixture of 4.8 g. 3-diethylamino-propylamine in 10 ml. benzene are added and the whole is refluxed for 90 minutes and, after standing overnight, again for 90 minutes. The residue is taken up in water, extracted with diethyl ether, the extract washed with brine, dried, filtered, and evaporated. The residue is taken up in methyl-ethyl-ketone, the solution acidified with 2.66 g. citric acid and the precipitate formed recrystallized from acetone-ethyl acetate-hexane to yield the trans-2-{4-[2-(4-chloro - phenyl) - 1,2,3,4 - tetrahydro - 1 - naphthyl]-phenoxy}-acetic acid 3-diethylamino - propylamide citrate of the formula:

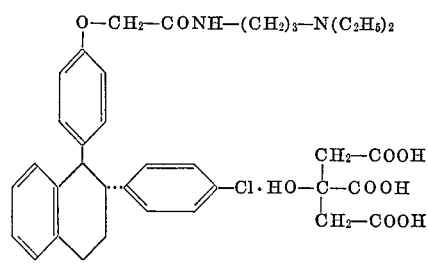

melting at 85–90° after drying at 56° for 4 hours in a high vacuum.

EXAMPLE 23

To the refluxing solution of 6.7 g. 1 - (4 - hydroxy-phenyl) - 4 - phenyl - 1,2,3,4 - tetrahydro - naphthalene in 36 ml. acetone, 2.4 g. sodium hydroxide pellets are added, followed by the dropwise addition of 2.75 g. chloro-acetic acid in 36 ml. acetone. The mixture is stirred and refluxed for 3 hours, during which time 100 ml. acetone are added to facilitate stirring. It is evaporated in vacuo, the residue taken up in water and the mixture washed with diethyl ether. The aqueous layer is acidified with 2 N hydrochloric acid and extracted with diethyl ether. The extract is washed with water, dried, filtered, evaporated and the residue recrystallized from benzene-hexane, to yield the [4-(4-phenyl-1,2,3,4-tetrahydro - 1 - naphthyl)-phenoxy]-acetic acid of the formula

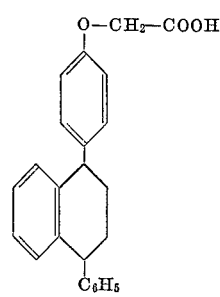

melting at 178–180°.

What is claimed is:

1. A pharmaceutical composition comprising a hypocholesterolemically effective amount of a compound having the formula:

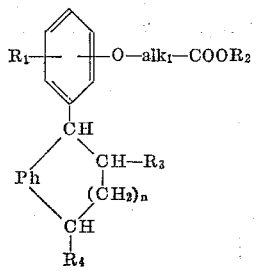

in which Ph stands for a member selected from the group consisting of 1,2-phenylene, (lower alkyl) - 1,2-phenylene, (lower alkoxy)-1,2- phenylene and (halogen)-1,2-phenylene, $R_1$ for a member selected from the group consisting of hydrogen, lower alkyl and halogeno, $alk_1$ for alkylene having from one to five carbon atoms, $R_2$ for a member selected from the group consisting of hydrogen, lower alkyl, N,N-di-lower alkylamino-lower alkyl and N,N-alkyleneimino-lower alkyl having five to seven ring members and in both of which the nitrogen atom is separated from the oxygen atom by at least two carbon atoms, one of $R_3$ and $R_4$ for hydrogen and the other for a member selected from the group consisting of phenyl, (lower alkyl)-phenyl, (lower alkoxy)-phenyl, (halogeno)-phenyl and $(R_2OOC-alk_1-O)-$ phenyl wherein $R_2$ and $alk_1$ have the meaning given above, and the letter $n$ stands for one of the integers 1 and 2, an ammonium or alkali metal salt of a compound in which $R_2$ is hydrogen and a pharmaceutically acceptable acid addition salt of a compound in which $R_2$ is N,N - di - lower alkylamino-lower alkyl or N,N-alkyleneimino-lower alkyl, together with a pharmaceutical excipient.

References Cited

UNITED STATES PATENTS 3,320,271   5/1967   Ledwicer.

ALBERT T. MEYERS, Primary Examiner
J. D. GOLDBERG, Assistant Examiner

U.S. Cl. X.R.
424—316, 317